May 25, 1954
J. G. BEDFORD
2,679,469
METHOD OF WELDING POLYETHYLENE AND LIKE PLASTIC MATERIALS
Filed April 2, 1951
2 Sheets-Sheet 1
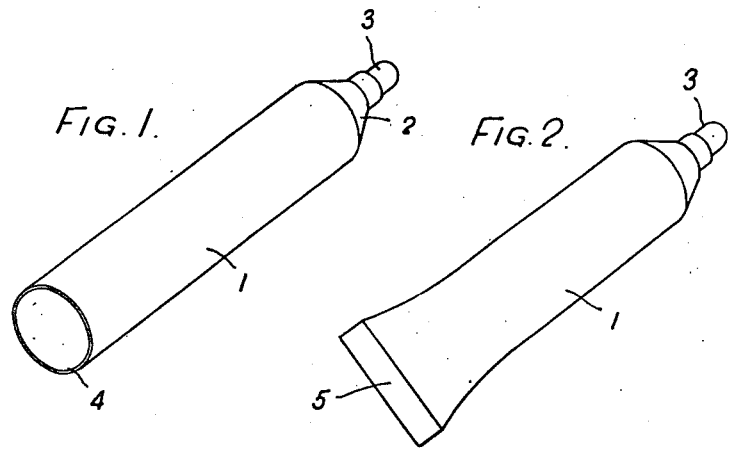
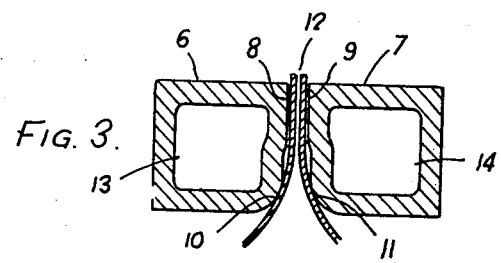
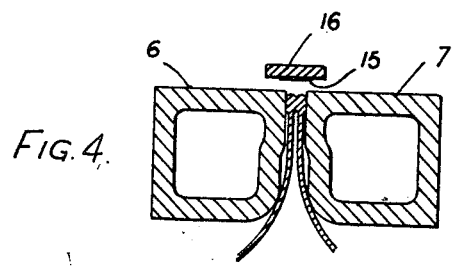
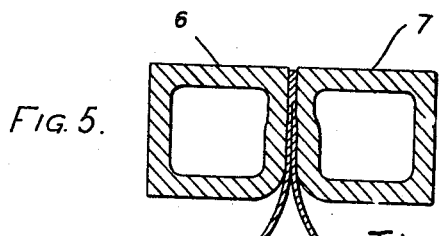
John Guy Bedford
Inventor.

May 25, 1954            J. G. BEDFORD            2,679,469
METHOD OF WELDING POLYETHYLENE AND LIKE PLASTIC MATERIALS
Filed April 2, 1951            2 Sheets-Sheet 2
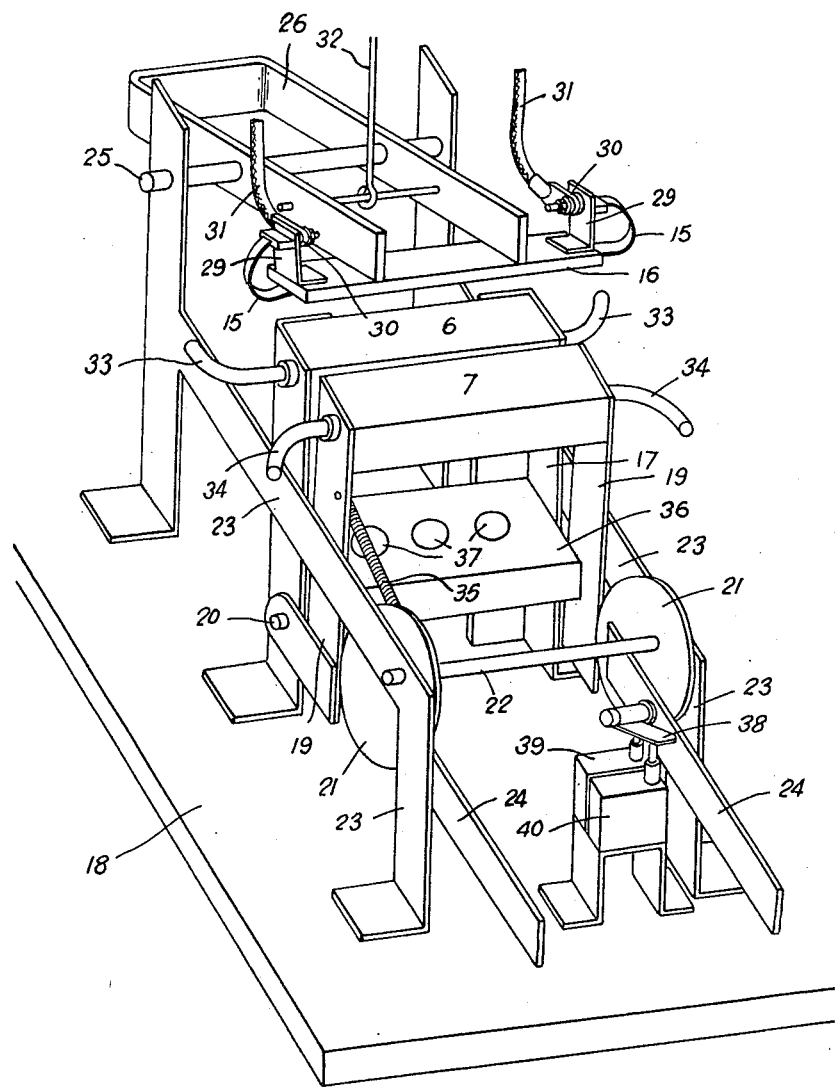

Patented May 25, 1954

UNITED STATES PATENT OFFICE 2,679,469

METHOD OF WELDING POLYETHYLENE AND LIKE PLASTIC MATERIALS

John G. Bedford, Louth, England, assignor to Ciba Pharmaceutical Products Incorporated, Summit, N. J., a corporation of New Jersey Application April 2, 1951, Serial No. 218,762

Claims priority, application Great Britain April 6, 1950

8 Claims. (Cl. 154—116)

This invention relates to the welding of polyethylene and like plastic materials having a relatively sharp melting point and low heat conductivity. The term "polyethylene" is used herein, for brevity, to denote a thermoplastic composition consisting of polymerised ethylene or of a mixture of polymerised ethylene and another polymerised olefine such as polymerised isobutylene.

Difficulty is experienced in joining the marginal portions of polyethylene in sheet form by welding, owing to the fact that polyethylene has a relatively sharp melting point and a short temperature range within which it remains liquid without change of characteristics, and that it has a low heat conductivity. Welding cannot be carried out economically by high frequency dielectric loss heating, owing to the low dielectric loss factor of polyethylene. The difficulty of welding polyethylene by direct heating is especially great in the case of laminae of which the combined thickness of the marginal portions to be joined ranges from approximately 0.020 to 0.100 inch. If the combined thickness is below that range it is possible to obtain satisfactory welded joints either by holding the marginal portions in contact face to face and heating the free contacting portions with a gas flame, or by pressing them in similar arrangement between heated platens. When the combined thickness is above that range the marginal portions can be welded by the usual welding rod technique. However, when the combined thickness is within the aforesaid range, attempts to weld the free contacting marginal portions by means of a gas flame as described above lead to weak joints, since the greater part of the molten polyethylene runs to the outer sides and sufficient heat does not reach the contacting inner surfaces. If an attempt is made to weld the marginal portions by pressing them into contact between heated platens, the period required for sufficient heat to penetrate to the inner contacting surfaces and raise them to welding temperature is longer than that needed for thinner material, and this longer heating period is very liable:

(a) To cause softening and consequent flowing of the adjacent material outside the platens, so that its thickness is reduced and its strength weakened.

(b) To cause the material in contact with the platens to decompose partially.

(c) To promote an adhesion between the platens and the outer surfaces of the material.

The present invention is based on the observation that satisfactory welded joints can be produced if, instead of the marginal portions being held in contact during heating, a small space is left between them and melting is brought about by directing radiant heat downwardly on to the marginal portions, and if the marginal portions after melting are subjected to controlled cooling.

According to this invention, therefore, a method of welding together the marginal portions of laminae of polyethylene or like plastic material, comprises placing between temperature-controlled platens the marginal portions of the material face to face with their free edges uppermost and a space between their inner surfaces capable of being bridged upon melting of the marginal portions, directing radiant heat downwardly on to the marginal portions to cause a molten bead to build up along each portion until the beads unite to bridge the space between those portions, and controlling the temperature of the platen surfaces and their proximity to the outer surfaces of the marginal portions to retard the rate of cooling so as to permit the region of fusion to extend laterally on each side of the initial molten bridge before the joint solidifies.

The term "platens" is used herein to denote members bounding the marginal portions to be welded and of which the temperature can be regulated to control the rate of cooling. The temperature of the platens may be regulated in any desired manner, for example, by providing conduits therein for the passage through the platens of water or other liquid maintained at a predetermined temperature.

The platens may be maintained at a fixed distance apart throughout the welding operation. However, it will generally be of advantage, after the retarded cooling and before the joint has solidified, to mould the joint to a desired shape by compression by bringing about a relative movement between the platens towards one another. For this purpose both of the platens may be moved towards each other or one of the platens may be moved towards the other. In this manner the joint can be shaped to give it a desired thickness, for instance, approximately equal to the combined thicknesses of the laminae which have been joined. The platen surfaces may be flat or shaped to impart a desired surface configuration to the sides of the joint. It may also be desirable, in order to facilitate insertion of the marginal portions between the platens, to move one or both of them in the reverse direction to make the space between them wider than is necessary during the melting and retarded cooling. Advantageously the platens are operated by means which is pre-set so that they can be brought into the successive relative positions which they are to occupy during each welding cycle.

Instead of remaining stationary during the welding operation, the marginal portions of the laminae may move during the welding operation between platen surfaces travelling at the same speed as the marginal portions. Thus, the platens may take the form of oppositely disposed rollers, wheels or endless bands of which the opposed moving surfaces are appropriately spaced apart, and between which surfaces the marginal portions of the laminae are fed. The moving platen surfaces may travel continuously in the same direction so that the marginal portions are welded during their passage between the platen surfaces. This method is of advantage when long seams have to be formed between the marginal portions of large sheets. Instead of travelling continuously in the same direction, the platen surfaces may move first in one direction to receive the marginal portions to be welded and then in the opposite direction to discharge the welded material.

Advantageously, the space between the inner surfaces of the marginal portions is approximately equal to one to two thicknesses of the laminae to be joined together. Depending on the thickness of the laminae, it may be desirable that the outer surfaces of the marginal portions should be in contact with the adjacent platen surfaces or that a space be left between those outer surfaces and the platen surfaces. Thus, while such a space may be left in the case of thin laminae, it may be necessary that thicker laminae should be in contact with the platen surfaces in order to obtain adequate heat transference throughout the mass for controlling the rate of cooling.

In order to facilitate the melting of the marginal portions it may be of advantage to place them between the platens with their free edges protruding above the platens to an extent such that on melting the protruding portions flow down into the space between the platens. This may not be found necessary in the case of thick laminae, but is of advantage with thin laminae to assist the building up of beads of adequate size.

Although the method of this invention is especially applicable to the welding of polyethylene, it is not confined to that material, and the expression "or like plastic material" is used herein to denote plastic materials other than polyethylene which resemble it in having a relatively sharp melting point and low heat conductivity, and especially those also having a low dielectric loss factor. While the method is especially valuable in enabling satisfactory welded joints to be made with polyethylene of which the marginal portions to be joined have a combined thickness ranging from approximately 0.020 to 0.100 inch, it can also be used for welding marginal portions of a combined thickness below or above that range.

The laminae of polyethylene or like plastic material of which the marginal portions are to be welded in accordance with this invention may be the laminae of separate pieces of sheet material or different parts of the lamina of a single piece of sheet material. The expression "sheet material" includes not only flat sheets, but any curved or otherwise shaped sheet material or article, for example, a tube of which an open end is to be closed by welding together marginal portions at the end of the tube to form a flat-tened seal, or the two flanged halves of a capsule of which the flanges are to be welded together.

When radiant heat is directed downwardly on to the marginal portions a bead of molten material builds up along each portion, and the beads grow in width until they unite so as to bridge the space provided between the inner surfaces of the marginal portions. The adjacent surfaces of the platens having a cooling action on the molten material, and if the cooling action is too great the bridge of molten material will solidify rapidly and form a relatively thin region uniting relatively thick unfused inner portions of the laminae on each side. The effect would then be one of adhesion between the laminae, of which the greater part remains unfused, rather than a welding effect in which the whole or the greater part of the laminae are fused. It is therefore necessary in accordance with the invention to control the temperature of the platen surfaces and their proximity to the outer surfaces of the marginal portions in such manner that the rate of cooling is sufficiently retarded to permit the region of fusion to extend laterally from the central molten bridge initially formed into the interior of the laminae on each side of the initial bridge, so that the whole or the greater part of the thickness of the laminae are also fused before the joint solidifies.

Any suitable source of radiant heat, for example, an electric heating element, may be disposed above the free edges of the marginal portions at a distance therefrom appropriate to bring about the necessary melting in a suitably short time, preferably a few seconds. It will be understood that the application of the radiant heat must in any case be discontinued before the fusion of the laminae proceeds so far that the molten material falls away from the region to be welded. To avoid this taking place with thin laminae it may be necessary to discontinue the application of radiant heat after a short time, and control the flow of molten material by means of the temperature controlled platens until it has flowed into such a position that the weld can be shaped by further closing of the platens. A convenient way of starting and discontinuing the application of radiant heat to the marginal portions is to move the source of heat into the appropriate position above those portions and retract it out of heating range as soon as the necessary melting has been achieved.

The method of the invention is especially useful for sealing the ends of tubes of polyethylene or like plastic material, for example, the ends of collapsible tubes used for packaging liquid or pasty compositions, for instance, a nasal spray liquid or toothpaste.

An example of the method of the invention as applied to the sealing of collapsible tubes will now be described with reference to the accompanying drawings, in which:

Figure 1 shows a collapsible tube of which the open end is to be sealed;

Figure 2 shows the tube after sealing;

Figures 3, 4 and 5 illustrate three stages of the sealing operation, each figure showing in cross section the platens with the end of a tube in position between them;

Figure 6 is a perspective view of the apparatus used.

The collapsible tube shown in Figures 1 and 2 is composed of polyethylene having a melting point of 115° C., for example, the product known commercially as Alkathene, grade No. 7. The tube consists of a cylindrical body portion 1 to contain, for example, a nasal spray liquid, a shoulder 2 and a nozzle 3 suitable, for example, for spraying the liquid into the nose. A marginal rim of the open end 4 of the body portion is to be flattened to form a seal 5 as shown in Figure 2. The walls of the tube at the open end, when pressed together, have a combined thickness of approximately 0.04 inch. The open end of the tube is flattened and placed between a pair of steel polished hollow platens 6 and 7 as shown in Figure 3, so that the free edges to be joined protrude slightly above the platens. The surfaces 8 and 9 of the platens in the region where the melting occurs are operative in controlling the rate of cooling, and are close to but, as shown, preferably not in contact with the outer sides of the laminae as they are relatively thin. The distance between the surfaces 8 and 9 in this position may be about 0.18 inch. The platens have lower portions 10 and 11 which make contact with and squeeze the walls of the tube at places sufficiently far below the end of the tube to ensure that the laminae will be spaced apart instead of being squeezed into contact. This not only ensures the production of a space 12 between the inner surfaces of the laminae, but also ensures that the strain of compressing the tube is taken by its walls at a place where the polyethylene is not subjected to a temperature such as would cause it to soften. This avoids any weakening in the region of the weld due to the stretching of softened material. The platens are maintained at a temperature of about 50° C. by continuously circulating heated water through the spaces 13 and 14 in the interior of the platens.

In order to cause a bead of molten material to build up along the end of each lamina, an electrically heated strip 15 of Nichrome alloy mounted on a refractory insulating support 16 is brought to a position about ⅛ inch above the ends of the laminae, the temperature of the strip being about 600° C. When the beads have united to bridge the space between the laminae, as shown in Figure 4, the heating strip is moved away out of heating range, and, after a period of retarded cooling of about 3 to 5 seconds, the platen 7 is moved towards the platen 6 into a predetermined position so as to compress the joint, while it is still soft or molten, and mould it to the desired shape. During this period of compression, the close contact of the platen surfaces with the joint accelerates the cooling. When the joint has solidified, the sealed tube is released by retracting the platen 7.

The apparatus in which the above described sequence of operations is performed is shown in Figure 6. The stationary platen 6 is carried by a pair of upright supports 17 secured to a base 18. The movable platen 7 is carried by a pair of upright supports 19 pivoted at their lower ends to pivots 20 on the supports 17. The platen 7 is moved towards the platen 6 by means of cams 21 which bear against the supports 19 and are eccentrically mounted for rotation about a shaft 22 carried in two side supports 23 secured to the base 18. The cams 21 are rotated by a lever 24 secured thereto. The supports 19 are maintained in contact with the cams 21 by means of a spring 35 secured at one end to one of the supports 19 and at the other to the shaft 22. At the other ends of the supports 23 is mounted a shaft 25 on which is pivoted a yoke 26 carrying at one end a strip 16 of refractory insulating material on the underside of which is secured a strip of Nichrome alloy 15 serving as a source of radiant heat. At the ends of the strip 16 are brackets 29 carrying terminals 30 by means of which the ends of the heater strip 15 are electrically connected to cables 31 supplying energising current. The yoke 26 is reciprocated by mechanism (not shown) through a rod 32 so as to move the heater strip 15 vertically from its inoperative position (shown in Figure 6) into its operative position (shown in Figure 4) and vice versa.

Water at the desired temperature is circulated through the platen 6 by means of pipes 33 and through the platen 7 by means of pipes 34. To the fixed platen supports 17 is secured below the platens a shelf 36. The shelf has three openings 37 each adapted to receive the nozzle 3 of a collapsible tube so that its shoulder 2 rests upon the shelf 36 and its open end to be sealed will protrude slightly above the platens as shown in Figure 3.

To the lever 24 is secured a lug 38 which is inclined so that as the lever 24 descends it first closes a control switch 39 and subsequently a second control switch 40. The platen 7 is initially in a position sufficiently widely spaced from the platen 6 to facilitate insertion of the open ends of the collapsible tubes between the platens. The platen is moved into this position by raising the lever 24 to its highest position. During the welding operation the platen 7 is subsequently moved into the predetermined position for melting (shown in Figures 3, 4 and 6) and then into the position for compression (shown in Figure 5). The two latter positions of the platen 7 are determined by positioning means (not shown), which consist of two suitably spaced depressions in the outer side of the righthand cam 21 and a spring-loaded steel ball mounted in the opposing surface of the righthand side support 23 so as to engage the depressions in turn as the cam rotates.

The aforesaid melting and compression positions of the platen 7 can be adjusted to suit laminae of different thicknesses by adjusting the position of the platen 7 relatively to its supports 19 in a horizontal direction towards and away from the platen 6.

The timing of the movements of the platen 7 in to and out of the melting and compression positions, and of the movements of the heater strip 15 between its operative and inoperative positions, is normally controlled by an electronic automatic timing device (not shown).

The timing and duration of the melting and cooling periods to suit the thickness and nature of the laminae to be welded may first be determined by trial and error by operating the apparatus by hand and setting the automatic timing device until the appropriate timing has been found. For this purpose the lever 24 is moved to bring the platen 7 to its wide open position and the tubes are inserted as described above. The lever 24 is then moved to bring the platen 7 into the melting position (shown in Figures 3 and 4), and in so doing the first switch 39 is closed to energise the circuit of the timing device which operates mechanism (not shown) to bring the heater strip 15 to its full heating temperature and lower it into its heating position above the ends of the tubes (shown in Figure 4). The automatic timing device is adjusted so as to switch the heater strip 15 to low heat and return it to its inoperative position after the appropriate melting period. This position of the heater strip 15 and platen 7 is shown in Figure 6. The timing device is also set so that, after a short period of retarded cooling, the lever 24 is moved automatically into the predetermined position for compressing the welded joints (shown in Figure 5). During this movement the lever 24 closes the second switch 48. This switch energises the timing device so that at the end of the predetermined cooling period the lever 24 will be automatically raised to its initial position, whereby the platen 7 returns to its starting position and releases the tubes and the switches 39 and 40 are opened.

When once the timing device has been set to provide the appropriate time sequence for a given batch of tubes to be welded, it is only necessary to insert the tubes by hand and bring the lever 24 manually into the melting position, the remainder of the operations being controlled automatically by the timing device.

I claim:

1. A method of welding together the marginal portions of laminae of a plastic material having a relatively sharp melting point and low heat conductivity, which comprises placing between temperature-controlled platens the marginal portions face to face with their free edges uppermost and a space between their inner surfaces capable of being bridged upon melting of the marginal portions, directing radiant heat downwardly on to the marginal portions to cause a molten bead to build up along each portion until the beads unite to bridge the space between those portions, and controlling the temperature of the platen surfaces and their proximity to the outer surfaces of the marginal portions to retard the rate of cooling so as to permit the region of fusion to extend laterally on each side of the initial molten bridge before the joint solidifies.

2. A method as claimed in claim 1, wherein the open end of a tube of said plastic material is sealed together.

3. A method as claimed in claim 1, wherein the plastic material is polyethylene.

4. A method of welding together the marginal portions of laminae of polyethylene, which comprises placing between temperature-controlled platens the marginal portions face to face with their free edges uppermost and a space between their inner surfaces capable of being bridged upon melting of the marginal portions, directing radiant heat downwardly on to the marginal portions to cause a molten bead to build up along each portion until the beads unite to bridge the space between those portions, and controlling the temperature of the platen surfaces and their proximity to the outer surfaces of the marginal portions to retard the rate of cooling so as to permit the region of fusion to extend laterally on each side of the initial molten bridge before the joint solidifies, said marginal portions having a combined thickness varying from approximately 0.020 to 0.100 inch.

5. A method of welding together the marginal portions of laminae of polyethylene, which comprises placing between temperature-controlled platens the marginal portions face to face with their free edges uppermost and a space between their inner surfaces capable of being bridged upon melting of the marginal portions, directing radiant heat downwardly on to the marginal portions to cause a molten bead to build up along each portion until the beads unite to bridge the space between those portions, and controlling the temperature of the platen surfaces and their proximity to the outer surfaces of the marginal portions to retard the rate of cooling so as to permit the region of fusion to extend laterally on each side of the initial molten bridge before the joint solidifies, the space between the inner surfaces of the marginal portions being approximately equal to one to two thicknesses of the laminae to be joined together.

6. A method of welding together the marginal portions of laminae of polyethylene, which comprises placing between temperature-controlled platens the marginal portions face to face with their free edges uppermost and protruding above the platens, whereby on melting the protruding portions flow down into the space between the platens, directing radiant heat downwardly on to the marginal portions to cause a molten bead to build up along each portion until the beads unite to bridge the space between those portions, and controlling the temperature of the platen surfaces and their proximity to the outer surfaces of the marginal portions to retard the rate of cooling so as to permit the region of fusion to extend laterally on each side of the initial molten bridge before the joint solidifies.

7. A method of welding together the marginal portions of laminae of polyethylene, which comprises placing between temperature-controlled platens the marginal portions face to face with their free edges uppermost and a space between their inner surfaces capable of being bridged upon melting of the marginal portions, directing radiant heat downwardly on to the marginal portions to cause a molten bead to build up along each portion until the beads unite to bridge the space between those portions, and controlling the temperature of the platen surfaces and their proximity to the outer surfaces of the marginal portions to retard the rate of cooling so as to permit the region of fusion to extend laterally on each side of the initial molten bridge before the joint solidifies, and molding the joint to a desired shape, after the retarded cooling and before the joint has solidified, by compression by bringing about a relative movement between the platens towards one another.

8. A method of welding together the marginal portions of laminae of polyethylene, which comprises placing between temperature-controlled platens the marginal portions face to face with their free edges uppermost and a space between their inner surfaces capable of being bridged upon melting of the marginal portions, directing radiant heat downwardly on to the marginal portions to cause a molten bead to build up along each portion until the beads unite to bridge the space between those portions, and controlling the temperature of the platen surfaces and their proximity to the outer surfaces of the marginal portions to retard the rate of cooling so as to permit the region of fusion to extend laterally on each side of the initial molten bridge before the joint solidifies, the space between the inner surfaces of the marginal portions being produced by applying the platens to the laminae at places remote from said portions, whereby the latter remain spaced apart.

References Cited in the file of this patent

UNITED STATES PATENTS

| Number | Name | Date |
| --- | --- | --- |
| 2,438,685 | Stevens | Mar. 30, 1948 |
| 2,459,234 | McDowall | Jan. 18, 1949 |
| 2,524,584 | Zehr | Oct. 3, 1950 |
| 2,562,146 | Hultkrans | July 24, 1951 |